United States Patent
Raymond

(10) Patent No.: US 7,483,215 B2
(45) Date of Patent: Jan. 27, 2009

(54) REFLECTIVE IMAGING ASSEMBLY FOR DISPLAYING INTERLACED IMAGES

(75) Inventor: Mark A. Raymond, Littleton, CO (US)

(73) Assignee: Genie Lens Technologies, LLC, Golden, CO (US)

( * ) Notice: Subject to any disclaimer, the term of this patent is extended or adjusted under 35 U.S.C. 154(b) by 89 days.

(21) Appl. No.: 11/467,706

(22) Filed: Aug. 28, 2006

(65) Prior Publication Data

US 2008/0080058 A1 Apr. 3, 2008

(51) Int. Cl.
*G02B 27/10* (2006.01)
(52) U.S. Cl. .................................. 359/627
(58) Field of Classification Search ............ 359/618, 359/619, 627
See application file for complete search history.

(56) References Cited

U.S. PATENT DOCUMENTS

| | | | |
|---|---|---|---|
| 3,586,592 A * | 6/1971 | Cahn | 428/29 |
| 4,034,555 A * | 7/1977 | Rosenthal | 368/232 |
| 4,766,684 A * | 8/1988 | Wah Lo | 40/454 |
| 5,729,332 A | 3/1998 | Fogel et al. | |
| 5,933,228 A * | 8/1999 | Taylor et al. | 356/124 |
| 5,967,032 A | 10/1999 | Bravenec et al. | |
| 6,822,707 B2 * | 11/2004 | Ariyoshi et al. | 349/112 |
| 6,896,938 B2 * | 5/2005 | Kastner et al. | 427/535 |
| 6,976,678 B1 | 12/2005 | Setteducati | |
| 7,016,116 B2 | 3/2006 | Dolgoff | |
| 7,072,085 B2 | 7/2006 | Ouchi | |
| 7,121,693 B2 * | 10/2006 | Klose | 362/331 |
| 2003/0035220 A1 * | 2/2003 | Hawver | 359/619 |
| 2004/0166258 A1 | 8/2004 | Mau et al. | |
| 2004/0240777 A1 * | 12/2004 | Woodgate et al. | 385/16 |
| 2005/0142376 A1 | 6/2005 | Kastner et al. | |
| 2005/0248850 A1 | 11/2005 | Goggins | |
| 2008/0037131 A1 * | 2/2008 | Steenblik et al. | 359/619 |

OTHER PUBLICATIONS

Opti-Gone Associates, Mirage Model 22 Gigantic 3D Hologram Maker, www.optigone.com, Jul. 20, 2006.

* cited by examiner

*Primary Examiner*—Ricky L Mack
*Assistant Examiner*—Mahidere S Sahle
(74) *Attorney, Agent, or Firm*—Kent A. Lembke; Marsh Fischmann & Breyfogle LLP

(57) ABSTRACT

A reflective imaging assembly for viewing an interlaced image to provide a three dimensional or animated visual display. The assembly includes an image element having segments or strips of an interlaced image and includes a reflective substrate including reflectors or mirror elements each having an elongate reflective surface and extending parallel to the segments of the interlaced image. The reflectors focus on the interlaced image to illuminate the segments with reflected light to produce a visual display or effect. Each of the reflectors may have a parabolic cross section to focus reflected light rays onto the segments. A mounting substrate of transparent material is positioned between the image element and the reflective substrate. The mounting substrate abuts the reflectors and provides a planar surface spaced apart from the grooves upon which the image element is provided. Illumination spaces are provided in the image element to facilitate light reaching the reflectors.

22 Claims, 5 Drawing Sheets

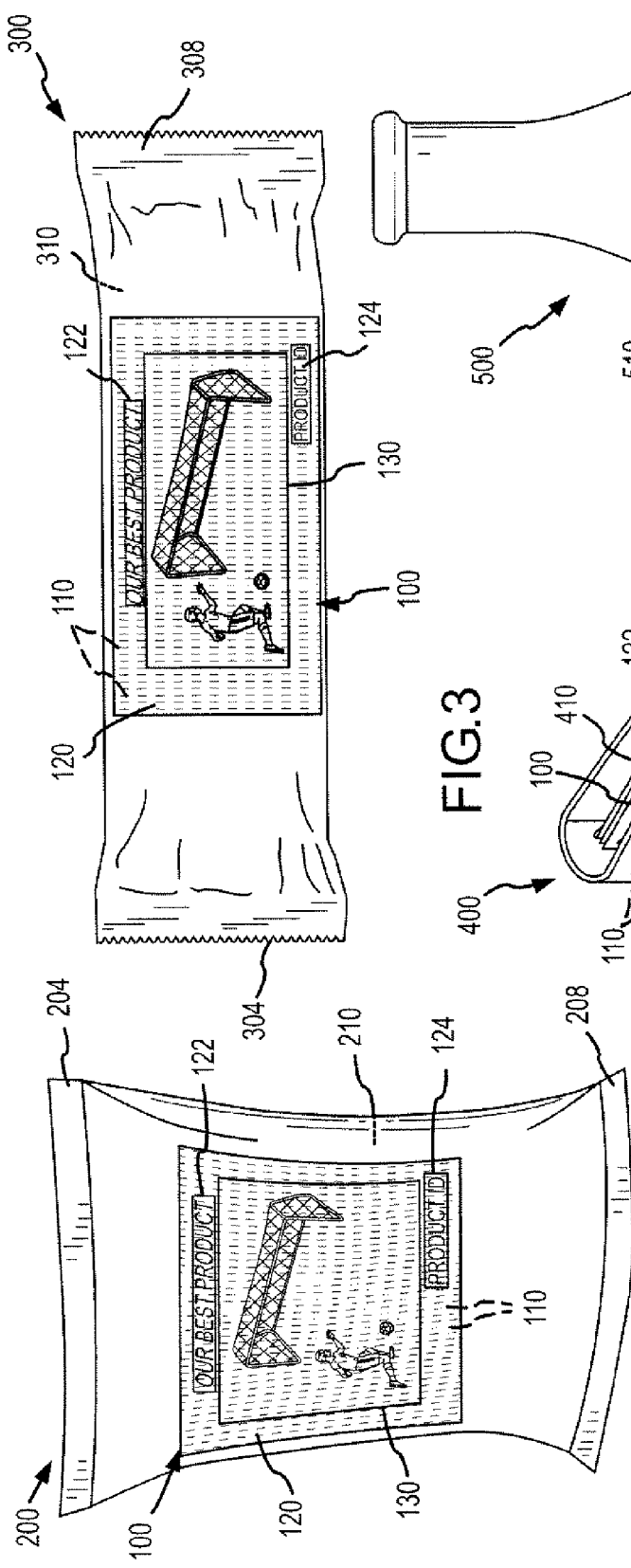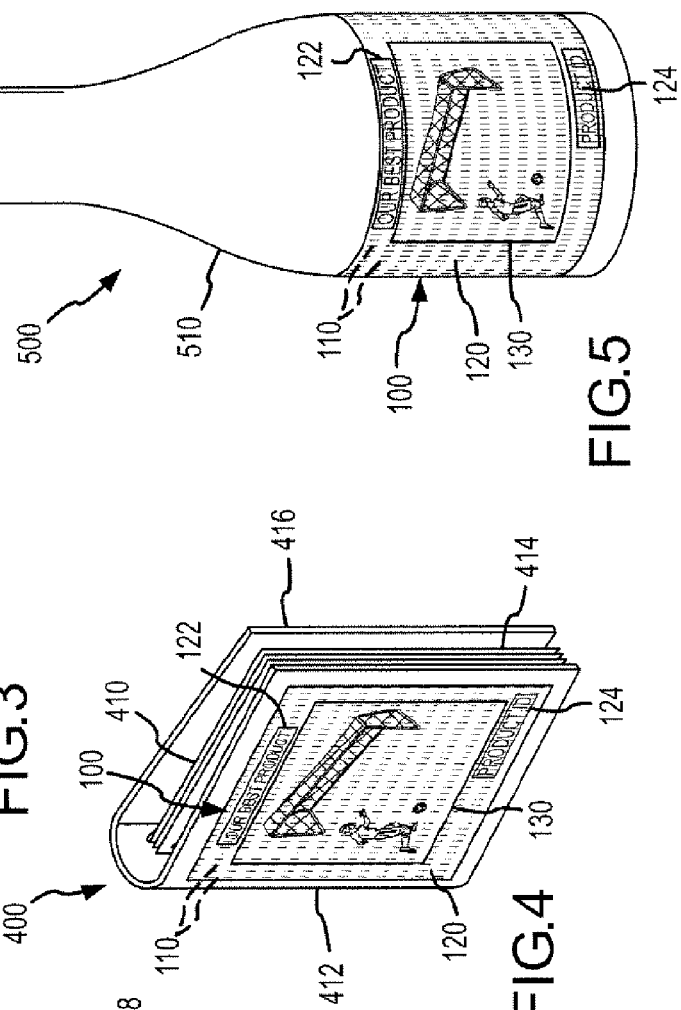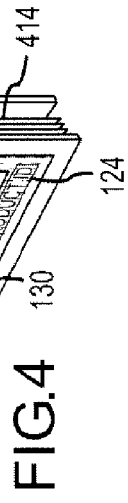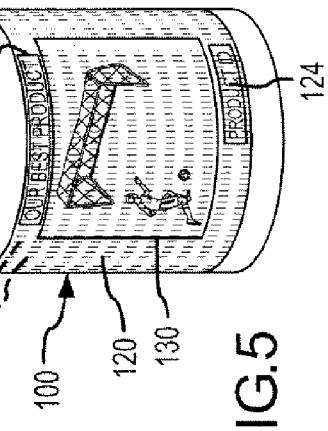

REFLECTIVE IMAGING ASSEMBLY FOR DISPLAYING INTERLACED IMAGES

BACKGROUND OF THE INVENTION

1. Field of the Invention

The present invention relates, in general, to methods and devices for facilitating the viewing of animated and multi-dimensional images and otherwise designed for producing optical displays with lens and reflective surfaces or mirrors, and, more particularly, to an assembly for use in packaging and on consumer and other products for producing images, such as 3-dimensional, colored images, with or without motion, from viewing of interlaced images illuminated by a plurality of parabolic mirrors or reflective surfaces with parabolic shapes or cross sections.

2. Relevant Background

In the competitive packaging and retailing industries (and especially, the beverage industry), marketing professionals and designers struggle to develop the individuality of their product. Most product differentiation is accomplished with the container and its packaging. In many eases, there is little difference between the contents and quality of two competing products. The differences are often ones of consumer perception of the products, and, in large part, consumer perceptions of quality and desirability are generated through creative packaging that leads to product identification and differentiation by package recognition and "shelf appeal." While there is an increasing demand for creative packaging, there is also an ongoing need to remain cost competitive. As a result, product differentiation typically needs to be achieved with minimum or even no added cost for a packaged product to be widely adopted by the packaging and retailing industries.

For years, lenticular graphics and lens systems have been used to produce eye-catching graphics for packaging, displays, stadium cups, postcards, printed goods, and other products (e.g., products for which shelf appeal is important or desired). Elaborate graphics are sometimes produced with lenticular graphic labels using 3-dimensional (3D) displays and animation. Lenticular lens material is used in the packaging industry for creating promotional material with appealing graphics and typically involves producing a sheet of lenticular lens material made up of a layer of lenticular lenses and an interlaced image is printed on the back side of the lens layer. The lenticular lens material is then attached to a separately produced object for display. The production of lenticular lenses is well known and described in detail in a number of U.S. patents, including U.S. Pat. No. 5,967,032 to Bravenec et al. In general, the production process includes selecting segments from visual images to create a desired visual effect and interlacing the segments (i.e., planning the layout of the numerous images to produce "interlaced images"). Lenticular lenses or lens sheets are then mapped to the interlaced or planned segments, and the lenticular lenses are fabricated according to this mapping. The lenticular lenses generally include a transparent web that has a flat side or layer and a side with optical ridges and grooves formed by lenticules (i.e., lenses) arranged side-by-side with the lenticules or optical ridges extending parallel to each other the length of the transparent web. To provide the unique visual effects, ink (e.g., four color ink) is applied to or printed directly on the flat side of the transparent web to form a thin ink layer, and this printed image or interlaced image is viewable through the transparent web of optical ridges.

In many applications, lenticular lens arrays and the associated interlaced images are not used due to the added cost per package or label. For example, many lenticular lens arrays require a lens thickness or material mass to achieve a desirable graphic effect, which adds undesirable material costs. Additionally, the material associated with a lenticular lens array may be 10 to 20 mils or more thick. Such arrays are often stiff or rigid, which makes the use of lenticlar lens arrays inappropriate for many applications that require flexible packaging or simply require very low packaging costs. For example, flexible, low cost packaging and/or labeling for chips and other snacks that use plastic or foil bags, for candy bars with thin foil wrappers, and for many other retail products that have foil or thin package walls or labels (e.g., label or wall thicknesses less than 10 or even 5 mils).

In addition to lenticular imaging devices, holography is also used in some cases to achieve visual effects such as with or in notebooks, software boxes, trading cards, and other products. While holography can be used in some packaging applications to differentiate a product, it is not widely in use in the retail industry. In part, this is due to high costs. Additionally, holography may not be effective at showing colors in many lighting situations in which retail products are displayed such as fluorescent lighting environments. Further, the origination may be very expensive for most holograms, and the fabrication (e.g., embossing) tools are typically unique and costly. The substrates or base materials used in holography assemblies and devices often are not desirable packaging materials, such as polyethylene terephthalate (PET).

Hence, there remains a need for packaging assemblies, products with graphic display assemblies or elements, and methods of producing labels, other packaging elements, and optical illusion or display devices that provide desirable graphic effects with acceptable added costs, e.g., at lower costs when compared with holography and conventional lenticular imaging in standard containers. Preferably such systems and methods would allow thin labels and often-used flexible packaging materials (such as foil and other bag and wrapper materials) to be utilized to create high quality, eye catching images.

SUMMARY OF THE INVENTION

The present invention provides reflective imaging assemblies and methods of making such assemblies. The imaging assemblies generally include a reflective substrate or layer that includes numerous reflectors or mirror elements. A mounting substrate is provided over this reflective substrate and is made up of a translucent to transparent material, e.g., plastic or glass, that fills the mirror elements and also typically provides a flat or relatively planar surface distal or opposite the mirror elements. An image element is attached to, such as with adhesive or more typically by printing, the planar surface of the mounting substrate. The image element generally includes an interlaced image having numerous elongate strips or segments from an image (e.g., from frames of a movie clip or the like) as would be provided for a lenticular lens array to achieve 3D and/or motion/animation effects. In some embodiments, the reflectors run parallel to the interlaced image segments and have a parabolic shape selected to focus light passing through the image element and mounting substrate back onto a subset of the image segments so as to illuminate a portion of the image (e.g., a frame of a movie clip or the like). The parabolic reflectors may be considered to have a focal point on or near the mounting surface or the image element printed or provided on such surface, and in some cases, the reflectors are each adapted to illuminate or focus on one segment at a time (e.g., to focus at a focal point having a width of about the width of an image segment).

More particularly, a reflective imaging assembly is provided for viewing an Interlaced image. The assembly includes an image element having segments corresponding to elongate strips of an image or frames of an interlaced image. The assembly further includes a reflective substrate including a plurality of reflectors or mirror elements each having an elongate reflective surface and extending parallel or substantially so to the segments of the interlaced image. The reflectors typically have a focal point proximate to a surface of the interlaced image so as to illuminate the segments (or a set of the segments) and produce a visual display or effect. For example, each of the reflectors may have a parabolic cross section to focus or reflect light rays striking their reflective surface onto one or more of the segments. A mounting substrate of material that is at least translucent to light may be positioned between the image element and the reflective substrate. The mounting substrate may abut the reflectors (e.g., fill grooves defining or forming the reflectors) and provide a planar or substantially planar surface distal and/or opposite the grooves and the image element may be provided on this planar surface (e.g., via flexographic, screen, or other printing techniques or with adhesive or the like). Further, the image element generally will include illumination gaps or spaces provided between or among the image segments. These illumination gaps may be blank spaces in the image where no ink is applied, for example, or otherwise provide a path for light to pass through the image element to strike the reflectors. For example, a set of image segments may be paired with a reflector and one, two, or more illumination gaps would also be provided for this reflector to facilitate illumination of one of the segments at a time (e.g., the focal point may be about the size or width of one of the image segments). The assembly may be provided as a wall or other portion of a container (e.g., a wall of a snack bag, a wrapper for a candy bar, or the like) or be a label or decal that can be attached to a container or to an object. In some cases, the overall thickness of the assembly is less than about 40 mils such as less than about 20 mils or less than about 10 mils. The reflectors may be provided at a range of frequencies selected to correspond with the interlaced image (or vice versa) but, in some implementations, the reflectors are provided at frequencies of of at least about 10 reflectors per inch and the image would be mapped to this frequency (e.g., be a 10 LPI or higher interlaced image).

According to another aspect of the invention, a method is provided for producing a sheet for use as or part of container sidewall, as a label or decal, or as a product wrapper. The method includes providing a sheet with a reflective surface and forming elongate grooves extending parallel on the reflective surface. The grooves each define a mirror element (e.g., a parabolic, elliptical, or curved mirror or reflector between ridges or peaks of the grooves). The method also includes filling the grooves with a substantially transparent material so as to form a mounting substrate on the reflective surface and to provide a flat or substantially planar surface spaced apart from the mirror elements. The focal points of the mirror elements preferably are on or proximate to the planar surface of the mounting substrate. The method further includes providing (such as by printing) an interlaced image upon the planar surface of the mounting substrate. The interlaced image generally includes image segments extending parallel to the grooves in the reflective surface. The interlaced image may further include a plurality of elongate illumination gaps that are at least translucent to light and are positioned between or among the image segments to allow light to pass through the interlaced image where it is reflected from the mirror elements onto the image segments. The sheet may be a metallic foil, the material of the mounting substrate may be a plastic, and the interlaced image may be formed of ink. In other embodiments, the sheet is plastic or other material with a layer of highly reflective material providing the reflective surface.

BRIEF DESCRIPTION OF THE DRAWINGS

FIGS. 2-5 are perspective views illustrating several representative packaging assemblies, covers, or containers incorporating the reflective imaging assembly of FIG. 1 including a bag (e.g., a snack bag), a candy bar or other similar wrapper, a notebook cover; and a bottle or container with a label including imaging assembly;

DETAILED DESCRIPTION OF EMBODIMENTS OF THE INVENTION

Figure 1:
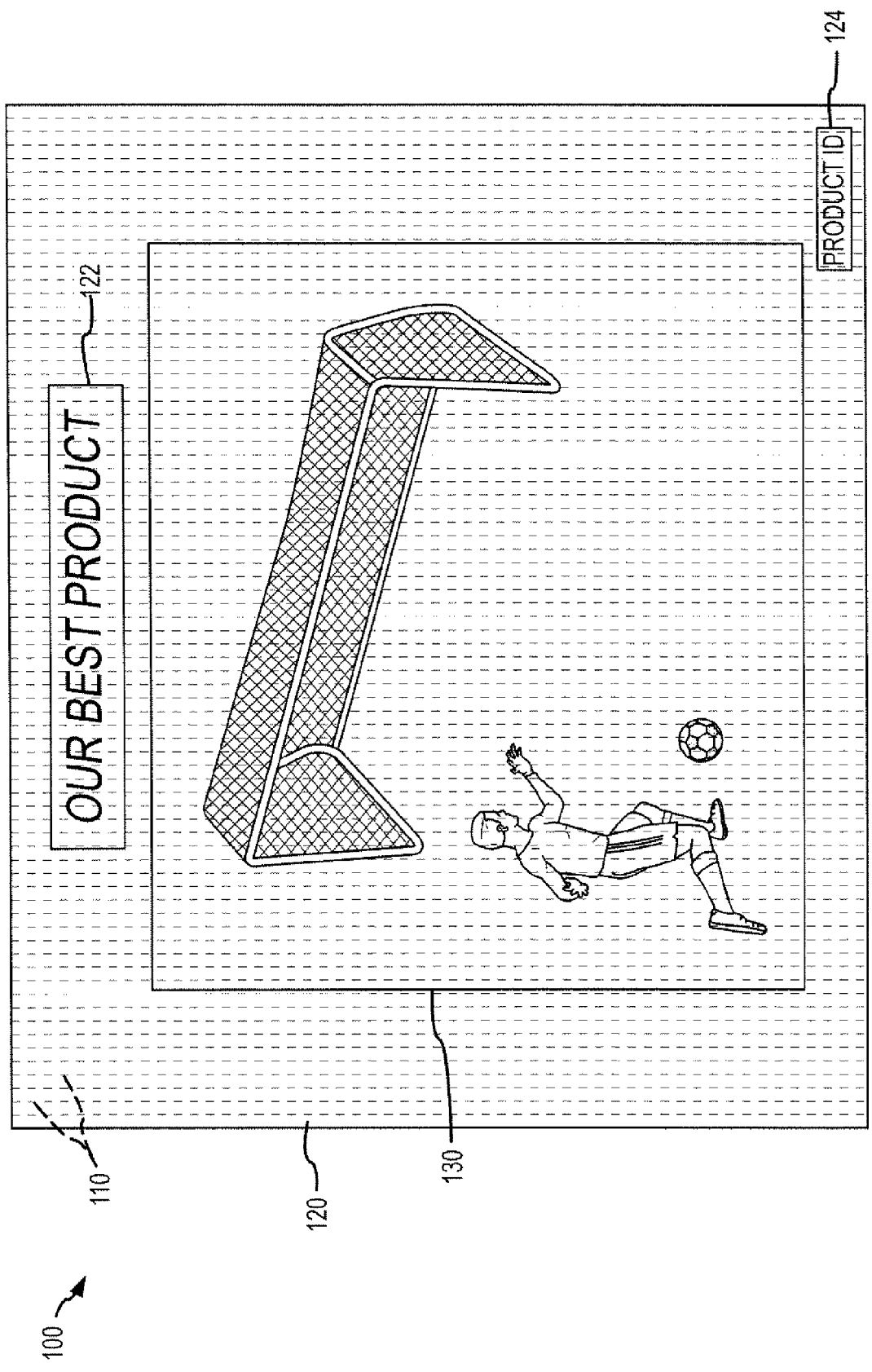
FIG. 1 is a plan view of a reflective imaging assembly of an embodiment of the present invention.

The present invention is directed to producing visual effects and eye-catching optical illusions or displays. To this end, the invention provides reflective imaging assemblies that may be provided as part of standalone objects or products but more commonly are provided or included as a part of other products such as in a product's packaging/wrapping or a container. For example, the reflective imaging assemblies of the invention may be provided as part of a snack or chip bag, as a candy wrapper, or as label or decal added to a container wall or other portion of an object or product. The invention is also directed toward methods of manufacturing such reflective imaging assemblies and products or devices including the imaging assemblies.

The term "reflective imaging" is used generally to describe the invention because the imaging assemblies of the invention include a mirror or reflector layer that includes a plurality of mirror elements or reflectors that reflect light onto segments of an image layer. For example, the image layer may include numerous segments of an image that are combined to form an interlaced image and the mirror elements are used to direct light selectively onto these segments to achieve a desired visual effect such as a 3D image, animation, a video clip, or the like. The interlaced image is generally configured similar to interlaced images designed for use with lenticular lens arrays; however, in contrast to lenticular lens arrays, the embodiments of the invention selectively illuminate segments of the interlaced image rather than focusing a viewer's line of sight on particular segments to achieve the desired effect.

In some embodiments, the reflectors or mirror elements have a parabolic cross sectional shape and are formed, for example, by embossing a layer of reflective material (such as a metallic foil or a layer of metal on a substrate or board) or by metallizing a layer of plastic, ceramic, glass, or other transparent or translucent material with parabolic troughs/grooves or ridges/bumps (e.g., depending upon which side is metallized). The assembly may further include a substrate or layer of transparent or translucent material (such as plastic, glass, ceramic, adhesive, or the like) applied over the reflectors or mirror elements upon or within which the interlaced image is provided (e.g., via printing on the transparent or translucent substrate, applying a decal or label to the substrate, or the like). The interlaced image (or "ink layer" in some embodiments) typically includes numerous image segments with gaps or spaces provided to allow light to shine through the interlaced image, through the transparent or translucent substrate, and onto the reflectors or mirror elements where it is reflected. Each mirror element or reflector reflects one or more parallel rays of light passing through the illumination gaps to a focal point that is proximate to or coincides with an interior surface of one of the interlaced image segments. The interlaced image, in these embodiments, is made up of a number of strips or elongated segments each corresponding to a portion of an image (such as small fraction of a frame of a video clip) and a number of at least partially translucent gaps or spaces configured to allow light to pass to each of the reflectors (e.g., one or more illumination gap is provided for each of the reflectors such as by providing a blank portion in the image where no or translucent ink is applied). The interlaced image is typically designed to have a frequency that corresponds to the frequency of the reflectors or mirror elements, e.g., 10 to 30 or more reflectors per inch or "lenses" per inch (LPI) using the terms of lenticular printing and graphics, which may also be considered lens or reflector density or coarseness. The use of the reflective imaging techniques described herein provides animation, 3D, video, and other visual effects at significantly lower material and fabrication costs when compared with holography and many lenticular lens array technologies and also enables impressive graphics and visual effects to be provided with flexible substrates or materials such as metallic foils and the like.

FIG. 1 illustrates a reflective imaging assembly 100 of an embodiment of the invention. As shown by dashed lines, the assembly 100 includes a plurality of reflectors or mirror elements 110. These elements 110, as explained with reference to FIGS. 6-10, include a reflective surface such as may be provided by a layer of metal such as aluminum, a metal foil such as those used in the packaging industry (e.g., for chip and other snack bags, for candy bar and other wrappers, and the like), or another material that has desirable reflective properties such as some polyester films, e.g., Mylar® and the like. This reflective surface may be provided on a plastic substrate or other substrate or the surface may be part of a metal or other reflective material layer or substrate. The overall shape of the assembly 110 is not limiting to the invention and may be chosen to be square or rectangular as shown such as for a bag wall, a wrapper, or a wraparound label implementation or another shape such as circular, triangular, hexagonal, other polygonal shape, or even many irregular shapes with these other shapes often being used when the assembly is provided as a decal or to suit a particular implantation. Similarly, the overall dimensions of the assembly 100 is not limiting to the invention with the reflective imaging concepts being readily adapted to small implementations such as candy wrappers to large implementations such as billboards. For ease of fabrication (such as when embossing is used), the reflectors 110 may be provided over the entire surface of assembly 120 (i.e., on one entire side of the reflective layer or substrate) or the reflectors 110 may be provided on select portions or surfaces of the assembly such as only under or adjacent the image element 130 (e.g., a printed interlaced image with illumination gaps between at least some of the image segments).

The reflective imaging assembly 100 further includes a substrate or layer 120. In some embodiments, this layer 120 is made up of a layer of clear, transparent, or translucent material such as plastic (such as propylene, amorphous polyester terephthalate (APET), or a combination of polymers), acrylic, adhesive, glass, ceramic, or the like that is provided over the reflectors 110. For example, in some embodiments it is desirable that the assembly 100 be flexible and in these cases the substrate 120 may be a relatively thin layer of plastic such as a clear to translucent film with a thickness of 50-gauge to 2-mil of a cast propylene, oriented polypropylene (OPP), polyester, polyethylene terephthalate glycol (PETG), or other useful material. In other cases, the substrate 120 is only provided between the image element 130 and the reflectors 110 such as when the substrate 120 is an adhesive or when the image 130 extends outward to the edges of the assembly 100. In addition to an interlaced image for achieved a desired graphic, the assembly 100 may include, as shown, additional graphics or information display areas 122, 124. These may be useful for displaying product or other data as shown with area or element 122 and/or for providing a product or object identifier such as a Universal Product Code (UPC), barcode, or other identifier as shown in area or element 124.

The imaging assembly 100 also includes the image element 130 for producing a desired graphic when light is reflected from reflectors 110 onto the back or interior side (i.e., the side proximate to the reflectors 110) of the image element 130. The image element 130 is generally made up of a plurality of image segments with a set of such segments being paired to at least one reflector 110 and 3D, motion, or other imagery is achieved when these segments are selectively illuminated with light reflected from reflectors 110. In some preferred embodiments, the image element 130 may be considered a modified interlaced image designed for use with a conventional lenticular lens array. For example, the image element 130 may include an interlaced image as is common in lenticular lens systems but that also includes one or more illumination gaps or gaps in the printed image or ink layer. Elaborate graphics can be produced with interlaced images or graphic labels viewed through a lenticular lens array such as by using 3-dimensional (3D) and animation. Instead of using lenticular lens material, the reflectors 110 can be used to reflect light passing through the illumination gaps in the image element 130 to illuminate selected portions or segments within the interlaced image or element 130. The image element 130 may be formed by printing onto layer 120 or by applying a printed image provided on a label or decal to the layer 120 or directly to reflectors 110. The production of interlaced images and lenticular lenses is well known and described in detail in a number of U.S. patents, including U.S. Pat. No. 5,967,032 to Bravenec et al., which is incorporated in its entirety herein by reference, and, therefore, the image design and reflector 110 design and production is not described in detail.

However, in general, the production process for the image element 130 includes selecting segments from visual images to create a desired visual effect and interlacing the segments (i.e., planning the layout of the numerous images to produce "interlaced images"). The frequency and focal points of the reflectors 110 are then mapped to the interlaced or planned segments, and the reflectors are fabricated according to this mapping (i.e., the interlaced image is selected to have a number of segments each with a particular width or size corresponding to the frequency and size or width of the reflected light at the focal point of the reflectors 130). Like lenticules or lenses of a lenticular array, the reflectors 110 (and corresponding strips or segments of an image) are arranged side-by-side with their reflective surfaces and/or ridges dividing such surfaces extending parallel to each other the length of the assembly 100 (or under all or a portion of image 130). To provide desired visual effects, some implementations of the image element include ink (e.g., four color ink or the like) that is applied to or printed directly on the transparent web or substrate 120 to form a thin ink layer. Illumination of the segments of this image is achieved by leaving at least one gap in the image element 130 or ink layer of element 130 for each reflector 110. For example, the ink layer interlaced image that extends parallel to and adjacent/over a reflector 110 is made up of a set of image segments and also one, two, or more elongate clear or at least translucent gaps or spaces between two adjacent image segments. As discussed below, the illuminating gaps or spaces may have the same width, a smaller width, or a greater width that the image segments of image element 130. It will also be understood that while 3D and some other graphics are better achieved when the reflectors 110 extend vertically as shown in FIG. 1 the invention also can readily be applied to implementations in which the reflectors and corresponding image segments/illumination gaps extend horizontally in assembly 100 (or when positioned upon a product on a wrapper, a label, in packaging, or the like).

The assembly 100 may be utilized as a standalone device for creating a desirable optical illusion or visual display such as motion by providing 10 to 30 or more frames of a video, by providing a 3D effect, or other effects that are associated with lenticular lens systems and their interlaced images. However, the assembly 100 often will be implemented as a portion of a packaging assembly such as a wrapper, a portion of a container or package, or the like. With this in mind, the following description stresses packaging and other applications and, particularly, those applications that often use thin and even flexible packaging such as snack bags, candy wrappers, and the like. These embodiments are desirable because they lend themselves to existing labeling or packaging techniques and techniques of manufacturing labels such as embossing, labeling including the use of adhesives, wraparound labels, heat shrinking, and the like, and printing. However, the inventive techniques are also equally applicable non-packaging applications such as for any object in which it is desired to provide a 3D effect, animation/motion, or other visual effects using the reflective imaging techniques described herein.

FIGS. 2-5 illustrate several representative, but not limiting, embodiments of packaging, containers, products, or objects in which the reflective imaging assembly 100 may be incorporated or otherwise utilized to achieve a visual display or effect. FIG. 2 shows a bag or flexible container 200 such as may be used for snacks including chips, pretzels, and the like. In this embodiment, the assembly 100 is provided as or as part of a front wall of the bag 200 and sealed at a top end or edge 204 and a bottom end or edge 208 to a rear wall 210. The rear wall 210 typically may be made of similar materials as the front wall or assembly 100 and may or may not include the reflectors 110 and image element 130 (and other components of assembly 100). In other words, the container or bag 200 may include one or more image elements 130 or assemblies 100 to achieve visual displays on 1, 2, or more sides and/or locations.

The container 200 may be manufactured similar to many conventional snack bags such a potato chip bags and the like. Polymer resins may be utilized to form the assembly 100 and container rear wall 210 such as polyethylene terephthalate (PET). Producing the container 200, which may or may not be filled with snacks or other items to practice the invention may involve melting and squeezing the plastic or polymer resin under high pressure into thin sheets (e.g., 5 microns or thicker). The plastic sheet may be further modified by, for example, coating them with a thin layer of aluminum, to result in a thin, flexible, air-impermeable, heat-workable, packaging material. Modern packaging materials may include several layers of material, with each layer serving a different need (strength, permeability, visual appeal, and others). Product labeling and graphics including the image element 130 can be printed onto the material of substrate 120 (and the substrate including reflectors 110) while it is still in its flat, continuous sheet format. The foil in this case may then be embossed and further coated with substrate 120 or have with image element 130 applied by printing and/or adhesives. Rolls of the material (e.g., rolls that include imaging assembly 100 and rolls of material for rear wall 210) can be easily shipped to the potato chip or other product factory, then fed into high-speed packaging machines that fold it together, and heat-seals then cuts the material into individual bags to be filled with chips or other products before again being heat-sealed. Of coarse, the particular method of manufacturing the container 200 is not limiting of the invention as long as the container 200 includes the imaging assembly 100 or another embodiment described herein or its equivalent.

FIG. 3 shows a wrapper 300 (which may include the enclosed product) such as a candy bar or other similar wrapper or container. The wrapper 300 is similar to the bag 200 in that the assembly 100 is provided on a front or first wall that is sealed at ends 304, 308 to a rear or second wall 310. In other embodiments (not shown), the assembly 100 may be configured to provide the entire or most of the wrapper (e.g., front and back walls) such as when a single sheet or wrapper 300 is used to wrap or enclose a product (e.g., as is the case for many snack bars, candy bars, other forms of candy and food, other retail products, and the like). The production of the wrapper 300 and application of it to a product (not shown) may be performed in well known ways with the addition of either applying the assembly 100 or forming the assembly 100 as part of the production of the wrapper 300.

FIG. 4 illustrates a notebook 400 implementation of the invention adapted to provide unique visual displays using reflective imaging. As shown, the notebook 400 includes a wire coil 412 that is used to spiral or connect a front (or first) cover 410, paper 414 and a back (or second) cover 416. The front or first cover 410 has a reflective imaging assembly 100 integrally formed or attached to it such that a viewer of the notebook 400 can view an optical illusion or visual display created by the image element 110 when combined with the substrate 120 and plurality of reflectors or mirror elements 110. The notebook 400 otherwise may be manufactured using well known and established techniques.

FIG. 5 illustrates a container (e.g., a bottle or the like) 500 that may be filled with a liquid or other material. For example, the bottle 500 may be a conventional plastic or glass bottle or jar and filled with water, soda, beer, an alcoholic beverage, a consumer product such as shampoo, soap, or the like, or with nearly any other material. The container 500 includes a sidewall 510 defining the shape, size, and volume of the container 500. Significantly, with the use of the reflective imaging techniques of the invention, the material used for the sidewall 510 may be clear, transparent, translucent, or even opaque as can be the product or material placed within the container sidewall 510 because the line of sight is not through the container sidewall 510 or through the interior space of the container 500. The container 500 includes the reflective imaging assembly 100 which is shown to take the form of a label for the container 500 and is applied upon the exterior surface of the sidewall 510 as wraparound label. In other embodiments, the assembly 100 may be provided as a differing label such as one that attaches to the sidewall 510 but does not wrap entirely around the container 500, and yet in other cases, the assembly 100 may be provided within the sidewall 510 or be provided or mounted on an interior surface of sidewall 510 or inside the interior void space defined by sidewall 510. Again, the container 500 may be empty or filled and the imagery created by assembly 100 would not be changed or affected.

As can be seen from the discussion of FIGS. 1-5, the reflective imaging technology of the invention as provided, for example, in assembly 100 has many uses and significant appeal to those in the packaging and retail industries trying to distinguish their products on crowded shelves. In some embodiments, the reflectors 110 are parabolic in cross section and the techniques or technology may be thought of as "parabolic lenticular technology" as it pairs these mirrors with interlaced images similar to those used with lenticular lenses or arrays. The reflective imaging technology described herein is appealing in part because it can be produced inexpensively and with very thin materials, which makes the technology and resulting assemblies (such as assembly 100) useful in many types of packaging and other applications. The images viewable with or produced by such imaging assemblies and products/objects including such assemblies may be 3D, animated, or both. The use of imaging assemblies, such as those using parabolic lenticular technology, is particularly attractive for use in chip/snack bags, candy wrappers, and other types of packaging (as shown in FIGS. 2-5), and, in many cases, there is no or little increase in cost relative to existing packaging methods. The imaging technology described herein may be used with a variety of substrates from cast oriented polypropylene (OPP) to foil boards used in carton packaging (such as a cereal box or the like which is not shown in FIGS. 2-5 but understood to be in the breadth of the invention).

As discussed, the image element 130 may be formed using well known printing techniques, such as those used with lenticular lens arrays, with the addition of providing illumination gaps (e.g. strips or segments that are clear, translucent, transparent, or simply do not have ink or an image segment). Reflective imaging as described may be used in conjunction with flexography, screen printing, and other more "course" types of printing. In lenticular optics, thinner lens materials require finer or higher frequency lenticules or lenses (e.g., increased LPI), which makes the printing of the corresponding interlaced image more difficult. In contrast, this is not a difficult problem with the reflective imaging of the invention that use parabolic (or other curve and other shaped) reflectors or imaging with metallic or other reflective coatings/materials to illuminate portions or segments of lenticular interlaced images. For example, a 10 mil lens in most lenticular optic printing implementations would necessitate a frequency of 150 LPI. However, a parabolic design of the invention can easily be done at about 3 mils thickness for assembly 100 and a frequency of the reflectors 110 of about 40 LPI. Therefore, while the 150 LPI frequency is very difficult or even impossible to print in most roll printing and would yield a modest result, an image element 130 for a frequency of 40 LPI can be printed relatively easily with existing printing technologies such as flexographic printing or the like to provide a very desirable visual effect (e.g., show 30 frames or more of action or the like).

Light is needed to achieve the desired effects, but the levels of light are relatively low and typically ambient light is adequate to show the graphics of image element 130 via reflectors 110. In preferred embodiments, the reflectors 110 are formed of a highly reflective material such as a metallic coating, a metallic paint, or other materials having desirable amounts of reflectivity to direct light from the reflectors 110 onto the interlaced image in element 130. The interlaced images are arranged such that light can reach the reflectors 110 and be reflected back to the backside of interlaced images in element 130 (or side facing or most proximate to the reflectors 110). One way to accomplish this is to prepare the data file in such a way that the interlaced images have some space or gaps in the vertical or horizontal direction or axes (e.g., along or parallel to the mirrors 110) between the segments or pixels. This allows photons or light to enter the mirror 110 and to be reflected off its reflective surface out through the image or data portions corresponding to the pixels or segments of the interlaced image such as in a self-correcting manner that illuminates the images in a selective manner (e.g., all or most of the segments relating to one particular frame at a time). The viewer views the assembly 100 (or product or package or object on which the assembly is provided) and even though all image segments are visible to the viewer, the viewer's eyes perceive the illuminated image segments more clearly, which produces the 3D, animation, and/or other effect for which the assembly 100 is designed.

Figure 6:
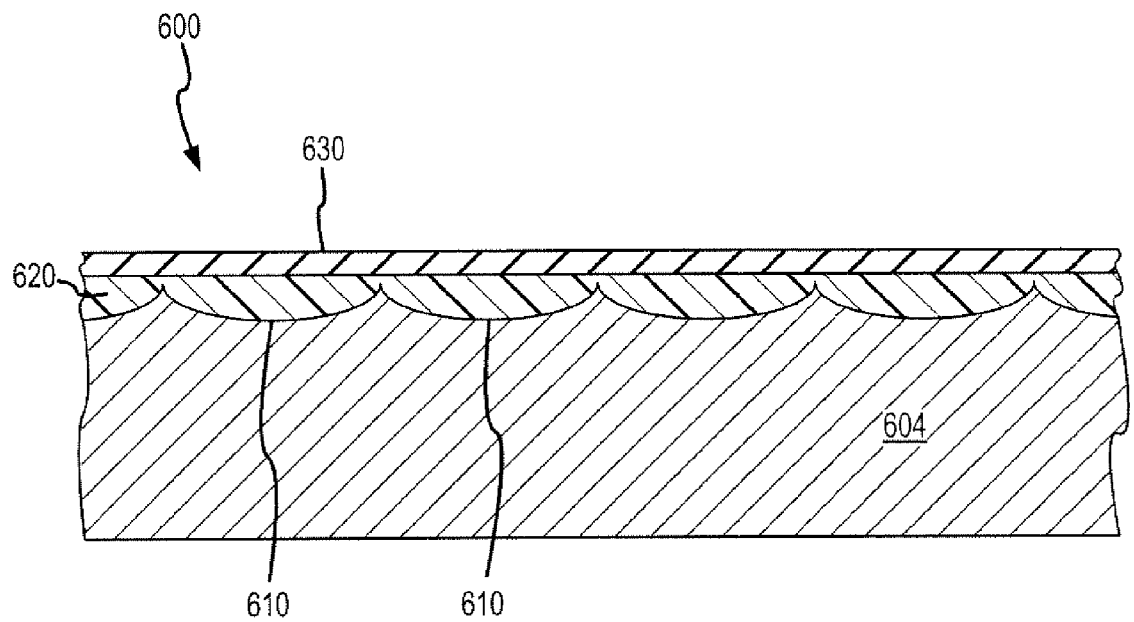
FIG. 6 is a partial sectional view of one embodiment of a reflective imaging assembly, which may be used to implement the assembly of FIG. 1 and the embodiments of FIGS. 2-5, showing the use of numerous reflectors or mirror elements having a parabolic or other cross section useful for selectively focusing on interlaced image segments.

FIG. 6 illustrates a partial cross section of one imaging array 600 of the invention such as may be used for assembly 100. The sectional view may be considered to have been taken within an image element and transverse to the elongate reflectors/grooves (which may run horizontally or vertically across an assembly). As shown, the array 600 is formed of three layers including a base layer 604 that may be considered the reflective surface, layer, or substrate of the assembly 600. On a surface of the reflective layer 604 a number of reflectors or mirror elements 610 are provided such as during the molding or forming of layer 604 or later machining or processing such as by an embossing operation. Each reflector 610 is defined by a pair of ridges and may have a number of curved and other cross sectional shapes selected to reflect light onto the image element 630 (and, more particularly, only one or more segments within an interlaced image of element 630). A layer 620 of clear, transparent, or at least translucent material is placed over the reflectors 610, and this layer 620 may be considered a protective substrate for mirrors 610 or a mounting substrate for image element 630 as the layer 620 may simply be adhesive or may be a clear, transparent, or translucent plastic, glass, ceramic, or other material (such as water, gas, or the like). The image element 630 includes an interlaced image and illumination gaps or spaces between at least some of the image or data segments. As discussed earlier, the image element 630 may be printed onto the layer 620 or otherwise provided over layer 620 and generally includes a set of image/data segments for each mirror element 610 along with one or more illumination gaps or spaces to allow light to pass through the image element 630 and strike the mirror element 610 and its reflective surface, which abuts the layer 620 and faces or is proximate to the image element 630.

In some embodiments, the cross section of the mirror elements or reflectors 610 is parabolic such that each reflector 610 generally can be described as having one focal point. In other words, light rays passing through illumination gaps in image element 630 (shown in FIG. 9) strike differing locations of the reflective surface of a reflector 610 but are focused to the same point. In other words, the use of parabolic cross sections for mirror elements 610 may be desirable because parabolic shapes on reflective surfaces are useful for bending or reflecting light to a desired focus point that is quicker or more radical than a reflective surface with a arcuate or semi-circular cross section (which may also have more than one focal point as is the case with spherical shaped mirrors) without the necessity of a significant amount of space or mass (i.e., the substrate 620 may be very thin or even eliminated to practice the invention. The assembly 600 is configured by selecting the shape of the reflector 610, the thickness and material (and its index of refraction), and location of segments of image element 630 such that the reflected light or reflected rays are provided on a focal point on the image element 630. More particularly, the reflected rays from mirror elements 610 typically focus at a focal point on the inner surface of element 630 (i.e., surface facing and proximate to the reflective surface of mirror elements 610 and abutting layer 620) and at a width of about one of the data/image segments (in some embodiments.

Parabolic shapes or cross sections for mirror elements 610, such as in a metallic substrate or other substrate with a metallic or highly reflective surface shown at 604, are useful for reflecting light back to a viewer at predetermined focal lengths. By carefully selecting the shape and size of the mirror elements 610 to be a parabola that reflects light to a surface of image element 630, which may be flat, the surface of image element 630 can be illuminated by each element 610 and, typically, at particular widths corresponding to the width of the focal point of the parabola of mirror element 610. The parabolic elements 610 may be round but are more typically linear (or elongated troughs with a parabolic cross sectional shape) that are engineered to have a focal length and focal point that focus reflected light onto the image element 630. Rather than focusing back to a viewer, the parabolic elements 610 are preferably focused at the image element 630, which may be considered a part of the structure of the parabola defining the mirror elements 610. The internal part of the parabola may be filled with glass, plastic, water, or any clear, transparent, or translucent material as shown with layer or substrate 620. The mirror elements 620 of layer 604 may be provided with a wide range of frequencies in the one or two per foot range, one or two per inch, to something much finer. For example, graphic implementations typically would utilized 10 LPI (or reflectors per inch) or finer (e.g., 10 to 40 or more reflectors 610 per inch). Manufacture of assembly 600 may include embossing the parabolic mirror elements or reflectors 610 (or grooves and ridges that define such reflectors) onto a metallic foil, a metallic laminate on a board or substrate, or other substrate 604 with a reflective surface.

Figure 7:
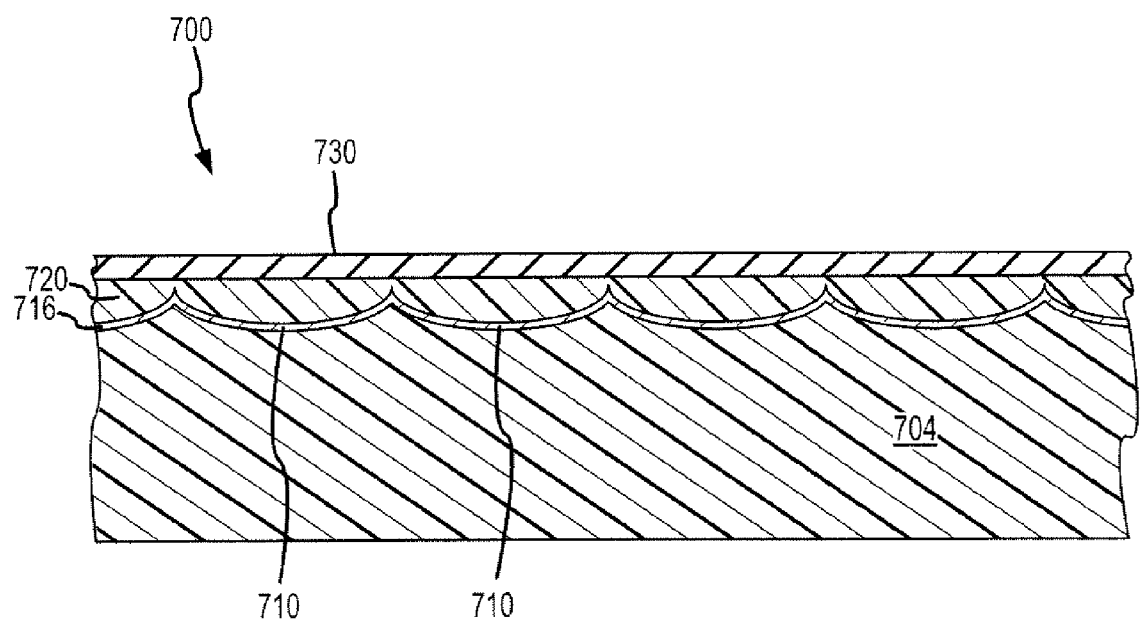
FIG. 7 is a sectional view similar to FIG. 6 showing another embodiment of a reflective imaging assembly of the invention in which a metal or reflective material is provided upon a grooved, e.g., embossed, surface to provide the parabolic or other curved reflectors or mirror elements desired in imaging assemblies.

FIG. 7 illustrates another reflective imaging assembly 700 in sectional view. The assembly 700 is similar to assembly 600 in that it includes a substrate 704 with a plurality of reflectors 710 extending parallel or substantially parallel in one direction or along one axis of the substrate 704. The reflectors 710 may be parabolic in cross sectional shape as is shown or may be another shape such as arcuate or semi-circular, elliptical (or a portion of an ellipse), or other useful shape for achieving a desired reflection of rays striking the reflective surface 716 of reflectors 710. As shown, the reflective surface 716 is provided by a coating or substrate applied to the substrate or layer 704. For example, the substrate 704, which may be plastic, glass, ceramic, or other material may be formed with or machined/processed to include the grooves or ridges defining the reflectors 710 and then the reflective surface 716 may be applied or provided such as by metallic painting, vacuum or other metallization, metallic coating, or otherwise applying or attaching a layer of highly reflective material (which may be a metal, a metallic compound, or any other material with a desired level of reflectivity). Another layer 720 is applied over the reflective surface 716 (such as an adhesive or plastic mounting substrate for image element 730), and on top or as a part of the layer 720, an image element 730 including the interlaced image with illumination gaps or spaces is provided (such as with flexographic, screen, or other printing methods). Again, the interlaced image of image element or ink layer 730 is mapped or aligned in assembly 700 such that a set of data/image segments or strips are aligned with the reflectors 710 to illuminate one or more of the segments or strips in each such set at one time (i.e., based on the angle of light or rays entering the illumination gaps).

Figure 8:
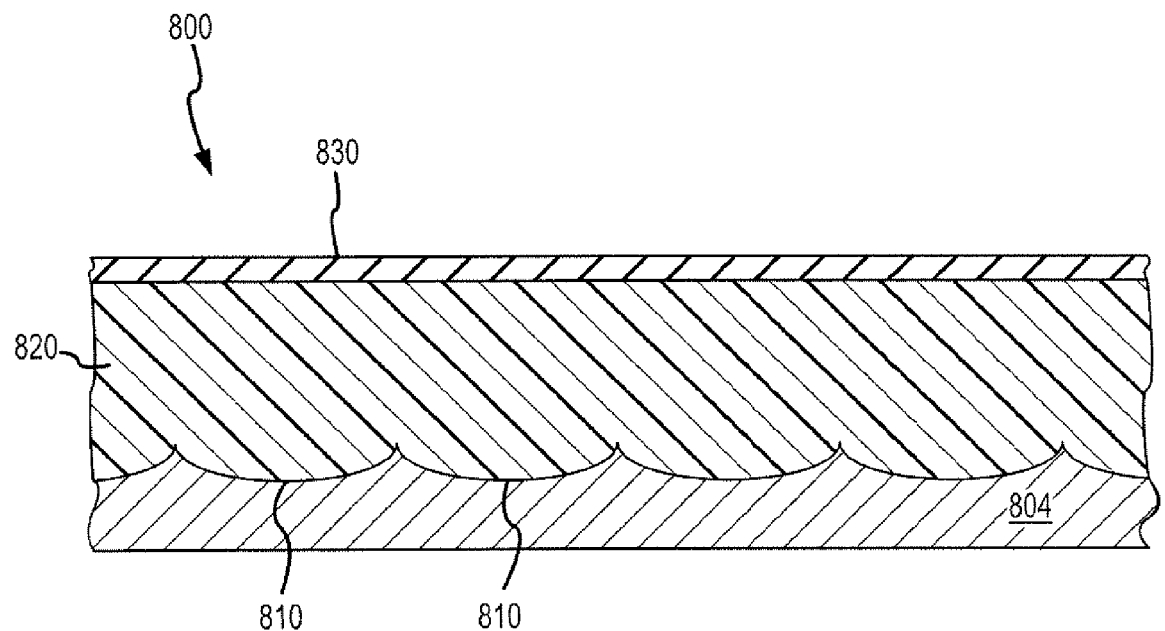
FIG. 8 is another sectional view similar to FIGS. 6 and 7 showing yet another embodiment of a reflective imaging assembly of the invention in which a metallized or reflector layer is applied to a surface of a transparent or translucent substrate that has a plurality of curved (e.g., parabolic) humps so as to provide the reflectors or mirror elements in the imaging assembly.

In other embodiments, it may be useful to provide an imaging assembly 800 as shown in FIG. 8 in which a plastic layer is embossed with lenticules and then metallized or a reflective coating or layer otherwise applied to produce desired reflective mirror elements. As shown, the assembly 800 includes an image element 830 on a planar or flat surface on a mounting substrate or layer 820. A reflective layer or substrate 804 abuts the mounting substrate 820 and includes a plurality of mirror elements or reflectors 810, which may be parabolic in cross section as shown or take a more elliptical shape, a semi-circular shape, or other shape useful for focusing light onto segments of image element 830. The assembly 800 appears similar to assembly 600 but formed differently, which may result in layer 820 being thicker than layer 804. For example, the assembly 800 may be formed by extruding or embossing a lenticular lens array or sheet from clear, transparent, or translucent material (such as a plastic), such as by embossing a sheet of clear or transparent plastic having a thickness of 2 to 20 mil or more to form a plurality of lenticules on one surface (e.g., the surface shown to abut substrate 804). Each of such lenticules or lenses is preferably designed with a semicircular, elliptical, or parabolic shape to focus light onto the opposing planar surface of the substrate 820 (i.e., the surface shown mating with ink layer or image element 830). The reflective layer or substrate 804 is then formed by coating (such as with vacuum metallization, metal painting, attaching a reflective foil, or the like) the lenticules or bumps on substrate 820 with a reflective material such as aluminum, a reflective plastic or compound, or the like. In this manner, the reflectors 810 are defined by the lenticules or lenses formed originally in substrate 820 and provide mirror elements 810 that reflect light back through the web of substrate 820 typically onto the planar surface of substrate 820 and abutting ink layer or image element 830. The mirror elements 810 may be parabolic and have a focal length set at the surface of the web or substrate 820. An interlaced image is provided in the image element 830 that corresponds to the frequency of the parabolic mirror elements 810 and that is printed or provided on the planar surface of substrate 820.

It may be useful to show more clearly operation of the reflective imaging technology of the invention from the point of view of a single reflector 910 of assembly 900 (which of course would include numerous reflectors similar to reflector 910 and optionally the other components shown in assembly 100 of FIG. 1). As shown, a reflective substrate 904 is provided (e.g., a foil or reflective material or a substrate with coated with a reflective layer) with a reflective surface or reflector 910 that is has a parabolic cross section. The interior of the parabola defined in part by the sidewalls of the reflector 910 is filled with a clear, transparent, or translucent solution, gas, or material such as a plastic, glass, or ceramic provided by layer or substrate 920. An image element 930 is provided on the planar surface of the mounting substrate 920, e.g., on the surface distal to the reflector 910. The image element 930 includes illumination gaps or gaps in the ink of the layer as shown at 911 and 912 and also includes a plurality of image/data segments 914 (i.e., a set of data/image segments or strips paired with reflector 910 that each may represent a portion of an image or a frame of a video or animation clip).

During operation or use, a viewer or user 950 of the assembly 900 can see all of the segments 914 but the segment 915 is illuminated (i.e., the "illuminated segment" or segment at the present focal point of the mirror element 910) and is highlighted or appears much more prevalent or clear to the viewer via line of sight 952. Illumination of segment 915 (or selected display of segment 915) is achieved because parallel light rays 916, 918 pass through illumination gaps 911, 912 and strike the reflective surface of reflector 910. The parabolic shape of the reflector 910 causes reflected light or rays 917, 919 to both be reflected to a single focal point 932 on the inner surface of element 930 (i.e., the surface abutting mounting substrate 920 or facing toward reflector 910). The focal point 932 at the time and/or light conditions shown in FIG. 9 coincides with image/data segment 915, which results in the image segment 915 being illuminated by reflected light rays 917, 919. Preferably, the reflector 910 and thickness and material of substrate 920 are selected or designed such that the focal point 932 is always on one or more of the segments 914 (and, preferably, on one such segment at a time). Further, it is generally seen that better illumination results are achieved if the width, w, of the focal point or of the reflected rays (or the combined width of all such rays) is less than or about equal to the width of the illuminated segment 915, but in some cases the light 917, 919 that is reflected may illuminate at least a portion of neighboring or adjacent segments 914. The reflector 910 is shown to have a parabolic cross section, which may be defined by its height and base dimensions, h and b, respectively. The assembly 900 and its visual display results are also dependent upon the thickness of the substrate 920 between the ridges or peaks of reflector 910 and the interior or proximate surface of the image element 930. Generally, the mass associated with substrate 920 is kept relatively low, especially in packaging applications, and, therefore, a minimal gap is often provided between the ridges of reflector 910 and image element 930 so as to provide a planar or relatively planar mounting surface for image element 930 or as part of the process of applying or attaching the element 930 in assembly 900.

Two gaps 911, 912 are shown in assembly 900 but in other embodiments only one gap is provided or more than two are used such as three, four, or more (such as between each pair of adjacent segments 914). The size or width of the illumination gaps 911, 912 may also be varied to practice the invention, and it generally ranges from somewhat smaller or narrower than the segments 914 to significantly greater in size (e.g., 3 to 5 or more times larger or wider). The goal is to allow significant amounts of light 916, 918 into the parabolic mirror 910 while providing desired quantities of data in segments 914 and these goals preferably are considered and balanced in designing an assembly 900. The number and size of the illumination gaps 911, 912 may also be varied along the length of the mirror element 910 or among differing ones of such mirror elements to allow the amount of light to be varied across an image element 930 (and, in some cases, the gaps 911 and/or 912 may not extend the entire length of a mirror element 910 or not run continuously (e.g., be blocked or covered in some portions)). This allows a designer of the assembly 900 to make differing areas of the interlaced image in element 930 to appear brighter and/or more significant in the displayed image. For example, more or larger gaps 911, 912 may be provided over mirror elements 910 that are paired with figures, characters, or other foreground images while background or less important images may be illuminated with less or smaller gaps 911, 912 over mirror elements 910 paired with sets of image segments associated with such background imagery or data.

Figure 9:
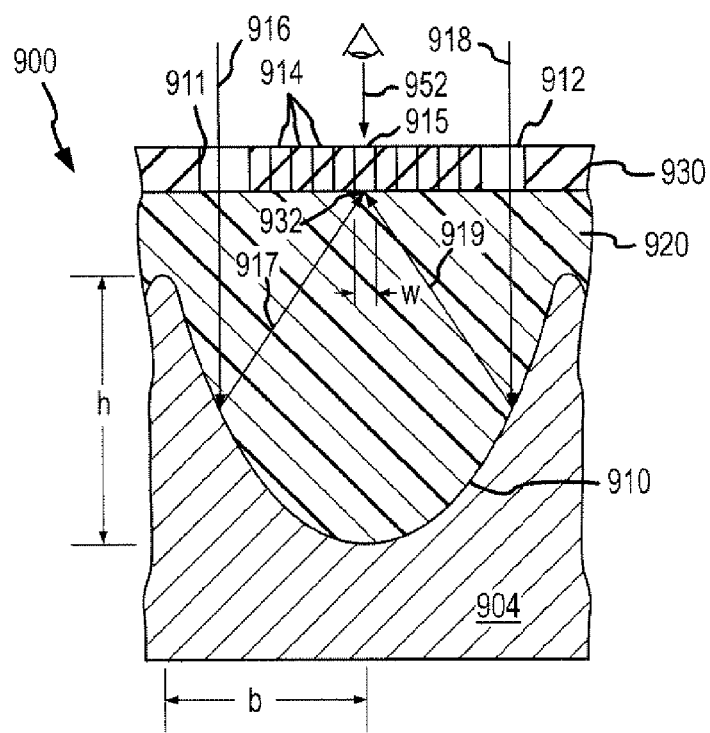
FIG. 9 is an enlarged or close up view of a single reflector or mirror element having a parabolic cross section of that may be used in a reflective imaging assembly of the invention.

As can be seen in FIG. 9, the focal length of the parabolic reflector 910 is set at the surface of the structure 920 where image element 930 is mounted. The interlaced image 914 corresponds to the frequency of the reflector 910 and other reflectors in assembly 900 not shown in FIG. 9. Light 916, 918 enters the parabola reflecting assembly 900 and contacts the reflective surface of mirror 910 and is reflected back as shown by rays 917, 919 to the surface of image element 930 at the focal point 932 and typically to illuminate a width that is about the size of a data or image segment 915 (i.e., corresponding to the width of interlaced image segments 914 in the image element 930) although this is not a requirement to practice the invention. This illuminates an image slice including segment 915 and similar segments illuminated by other reflectors configured similarly to reflector 910 to give a viewer a display or optical effect, e.g., 3D, animation or motion, or other effect. In some embodiments, the parabolic shape is replaced with an elliptical or a semi-elliptical cross section or at least the side walls are made more parallel. This allows the light 916, 918 to be bent more quickly and keep the "cusp" of the embossing to a minimum or reduced level. An elliptical parabola can be used to focus light back to the surface of image element 930 and focal point 932 associated with a particular image segment 915.

Figure 10:
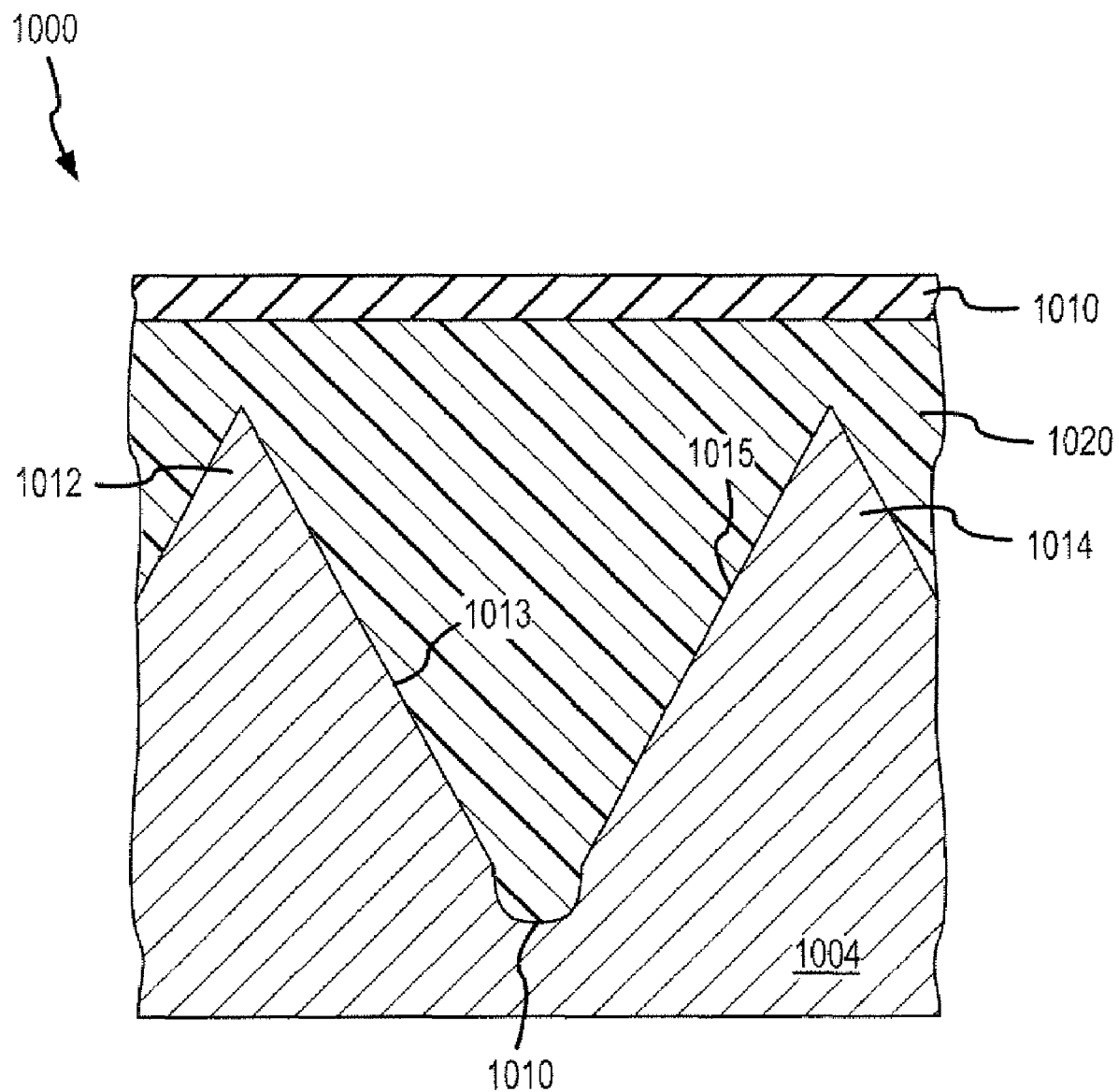
FIG. 10 is another enlarged or close up view of a single reflector or mirror element in which a reflector or mirror element is provided only at the tip or bottom of a trough between two ridges or peaks rather than with the entire or a substantial portion of the sides of such ridges as shown in the embodiment of FIG. 9.

FIG. 10 illustrates another imaging assembly 1000 of the invention by showing one of a plurality of reflectors or mirrors. As shown, the reflector 1010 is parabolic in cross section but the adjoining or adjacent sidewalls 1013, 1015 are straight, such that each ridge 1012, 1014 between the reflector 1010 has a triangular cross section. As shown, the assembly 1000 includes a reflective substrate 1004, e.g., a metal foil, a metal paint or covering, or other highly reflective material. The ridges 1012, 1014 and reflector 1010 may be formed by embossing of substrate 1004, during extrusion of substrate 1004, or by embossing substrate 1020 (and later applying or providing reflective material 1004 such as by vacuum metallization or coating that involves applying aluminum, copper, nickel, zinc, tin, or other metal or a thermally stable metal compound by evaporation and then condensation onto a plastic, glass, ceramic, or other substrate at least over the reflector 1010). The substrate 1020 typically comprises clear, transparent, or translucent material and provides a flat or planar surface for mounting (e.g., printing, attaching with adhesive, and the like) the image element 1010 with interlaced image and lamination gaps (not shown). The reflector 1010 is configured to reflect light passing through the image element 1010 and substrate 1020 back through substrate 1020 onto the image element. This may involve configuring the reflector 1010 as a partial ellipse or circle or as with a parabolic cross section to provide a focal point on the surface of element 1010 (e.g., with a width matching about the width of one of the interlaced images in the element 1010 (or slightly more or in some cases, a small width is illuminated).

The parabolic and other forms of reflective imaging described herein teach a unique way of providing 3D and animation graphics, which can be thought of as being somewhat between holographic and lenticular technologies. The reflective imaging of the invention allows imaging of 3D and animation effects using thin films and in color with reflective surfaces. The results are achieved in an economically desirable or inexpensive manner that makes it highly desirable for packaging applications (but, of course, the concepts may be used in other applications and with thicker films and substrates). The corresponding interlaced images may be linear as shown in the figures or be circular or even in a square or prism shape. Light typically enters the a parabola and is reflected by the mirror or reflective surface of the mirror element back to the interlaced image, thereby illuminating a "slice," "spot," or portion of the interlaced images giving the view a 3D or animated viewpoint. Images typically are interlaced in the same or similar way as would be performed in conventional lenticular optics, with the addition of optional round, square, or other patterns in addition to linear.

For example, instead of elongated troughs defining the reflectors, the reflectors may be provided in another pattern such as numerous concentric circles (or other shapes), and the interlaced image would need to be provided to match or correspond to such differing or unique shape. In another preferred embodiment (not shown), the reflectors are not elongate with a parabolic or curved cross section as shown in FIGS. 1-10 and are instead full parabolas provided as recessed surfaces or dimples across a surface, e.g., such a surface may take on the appearance of having dimples similar to a golf ball so as to provide reflectors similar to a fly's eye pattern. In this case, the interlaced image would also have to be varied to achieve a desired graphical effect by providing interlaced images mapped to the focal point of each of these parabolas (e.g., to map to the focal of each parabolic dimple on the surface or portion of the fly' eye). For example, the interlaced images may still be provided as linear or elongate slices but would be mapped to a plurality of parabolic or other shaped reflectors. Alternatively, as discussed further below, the interlaced image may be divided into a plurality of subsets that are provided adjacent to each of the parabolic reflectors. In each subset of image slices or segments, the image segments would be provided in a circular or similar pattern that begins at center point or image (e.g., a central segment having a diameter or size of about the focal width of the individual parabolic mirror or reflector) and has concentric rings with additional image segments (e.g., one or more image segments per ring in the pattern presenting the subset of image segments).

In the case of a plurality of parabolic reflectors (e.g., dimples that are metallized or provided in a reflective material), the parabolic indentations would be designed with desired focal lengths corresponding to the radius of the parabolas, e.g., at or near the surface on which the interlaced image is provided as was the case in the embodiments having linear troughs with parabolic cross sections. The individual parabolic reflectors are "nested" or arranged on a surface or substrate (such as on a surface or substrate 604, 704, 804, 904 as shown in FIGS. 6-9) so as to limit the space between such reflectors and/or so as to maximize the number of parabolic reflectors provided in a given space. Similarly, the size (e.g., diameter of the parabolic reflector at the surface of the reflective substrate) and number of the parabolic reflectors may be varied to practice the invention. Rather that a substantially linear focus (i.e., along the length of the reflectors 110 shown in FIG. 1), the result of the focus of the individual parabolic reflectors or reflective dimples in a surface is a plurality of points or focus points back on the interlaced image surface. These focus points illuminate the surface at each point within a predetermined range corresponding to the width of the focus of the parabolic reflector, and in some embodiments, this width corresponds to about the width of the interlaced data. For example, if the image segments are provided in concentric rings associated with the parabolic reflectors, the focal point may coincide with about the width or size of the central image and then with the width or thickness of each ring of images provided about this central image (e.g., with the central image or a portion of each image ring being illuminated at each particular viewing angle).

The data or images in the plurality of recessed surfaces or dimples examples may be traditionally interlaced in data strips or slices such as used in traditional interlaced images used with lenticular optics. In other embodiments, non-standard or conventional interlacing or arrangements may be used to form the interlaced images to be mapped to the non-linear parabolic (or other shaped) reflectors or reflective, recessed surfaces. For example, as discussed briefly above, the data or images may be interlaced from a center point or image outward. In this example, the center point or image of the each subset of interlaced images would be mapped or aligned to coincide with a focus point of one of the parabolic reflectors when viewed straight or perpendicular to the substrate containing the reflectors. Tilting the whole image up and down or side to side (or the viewer moving) so as to change the viewing (or reflective) angle changes where the focus point of the reflector causes light to illuminate the image. The use of non-linear reflectors allows the focus to move not just in one direction but from side to side and up to down (or on axes between these two).

The interlaced "rings" or concentric image segments may have viewpoints that could be more accurate representations of viewpoints around the desired image than can be achieved with linear reflective elements which typically only allow viewpoints to change in one direction (such as to provide motion). For example, an interlaced image may be provided that with the dimple reflectors may allow a viewer to see "over the top" or "beneath" an image from extreme angles viewed from the top or bottom. For example, when the viewing angle reaches a particular value (such as less than about 30 degrees or the like), the focus point may be targeted upon images of the top or the bottom of an image (e.g., the top of a characters head, shoulders, and the like or the bottom of the characters feet, looking upward at a character or figure, or the like). In addition, the use of numerous, non-linear reflectors or reflective dimples generally results in 3D images appearing in 3D regardless of the angle of viewing, which makes it somewhat less important to accurately line up the interlaced images with the "rows" of parabolic dimples or reflectors than was preferred with linear parabolic reflectors of the present invention.

Rather than providing the interlaced images in concentric circles mapped to each reflector, some embodiments of the invention utilize grids of interlaced image segments or data chunks. Typically each data segment in such a grid would have a size corresponding to the width of the focal point of the particular paired reflector. In one preferred embodiment, each portion of the grid is a square with sides have a length equal to about the width of the focal point of a matched parabolic reflector. By using squares of a grid rather than strips or elongate slices to provide the image segments, each square of the grid can be configured to contain the proper viewpoints for both axes (e.g., the x-axis and the y-axis) and to allow the same view around, above, and underneath an image as was the case for the centered interlacing scheme (e.g., interlaces images provided in concentric rings or circular strips about a center point/image). In another example, a traditional interlaced image with linear strips or elongate slices is modified to create the "seeing around" effect. In this example, portions of each linear strip or image segment is replaced with image segments that when focused upon by the parabolic dimples or reflectors display a portion above, below, or to/on the side of the main image. These additional data points or image portions may be considered substrips or smaller blocks dispersed in the conventional strip or image segment, and these additional data points or substrips are generally only visible at more extreme viewing angles such as when the image and paired reflector layer is tilted to a relatively sharp viewing angle such as less than about 30 to 45 degrees as measured relative to the viewed interlaced image or when the image is tilted in a second angle. In other words, this interlacing may be considered interlacing an image in two directions.

I claim:

1. A reflective imaging assembly, comprising:
   an interlaced image element with segments each comprising an elongate strip of an image, wherein the segments are organized into sets and wherein the interlaced image segment comprises at least one illumination gap proximate to each of the sets, the illumination gaps being at least translucent to light; and
   a reflective substrate comprising a plurality of reflectors each having an elongate reflective surface extending parallel to the segments of the interlaced image and having a focal point proximate to a surface of the interlaced image element, wherein the interlaced image element is spaced apart from the reflective surface and wherein light passing through the illumination gaps is focused by the reflectors onto a subset of the segments to illuminate the subset of the segments.

2. The assembly of claim 1, further comprising a mounting substrate of material that is at least translucent to light positioned between the reflective substrate and the interlaced image element, the mounting substrate having a planar surface proximate to the focal point of the reflectors upon which the interlaced image element is positioned.

3. The assembly of claim 2, wherein the material of the mounting substrate is a substantially transparent plastic.

4. The assembly of claim 1, wherein each of the sets of segments extends parallel and proximate to one of the reflectors and wherein the light striking each of the reflectors is focused on one of the segments in each of the sets of segments.

5. The assembly of claim 4, wherein each of the reflectors focuses on the segments at the focal point with a width of about a width of the segments.

6. The assembly of claim 1, wherein the reflective surface of each of the reflectors has a parabolic shape when a cross section is taken transverse to its longitudinal axis, the parabolic shape being configured to have a focal point proximate to or on the interlaced image element surface.

7. The assembly of claim 6, wherein the reflective substrate comprises a surface facing the interlaced image element and wherein the elongate reflective surfaces comprises parallel grooves provided in the surface of the reflective substrate.

8. The assembly of claim 7, wherein the reflective substrate comprises a layer of metal providing the reflective surfaces of the reflectors.

9. A container comprising the reflective imaging assembly of claim 1.

10. A label comprising the reflective imaging assembly of claim 1.

11. An apparatus for creating three dimensional, motion, or other graphical effects, comprising:
    a reflective substrate comprising a plurality of parabolic mirror elements formed of reflective material;
    a mounting substrate abutting the reflective substrate formed of a material that is at least translucent to light and comprising a substantially planar surface distal to the reflective substrate; and
    an image element positioned proximate to the planar surface of the mounting substrate comprising an interlaced image including a plurality of image segments;
    wherein each of the parabolic mirror elements are configured to have a focal point at or near the planar surface, whereby a set of the image segments is illuminated by light reflected from the parabolic mirror elements.

12. The apparatus of claim 11, wherein the reflective substrate comprises a plurality of linear grooves and wherein each of the parabolic mirror elements are positioned in one of the grooves.

13. The apparatus of claim 11, wherein the reflective substrate comprises a plurality of recessed surfaces with each of the surfaces comprising one of the parabolic mirror elements.

14. The apparatus of claim 13, wherein the image segments are presented in a plurality of subsets with each of the subsets comprising a plurality of concentric rings each comprising at least one of the image segments.

15. The apparatus of claim 14, wherein the parabolic mirror elements each have a focal point with a focal width and wherein each of the rings has a thickness of about the focal width.

16. The apparatus of claim 11, wherein the image element comprises ink defining the image segments and wherein the image element comprises a plurality of spaced apart illumination gaps between the ink of the image segments providing a path for light to pass through the image element.

17. The apparatus of claim 11, wherein the reflective substrate comprises a layer of metal and the reflective substrate, the mounting substrate, and image element have a thickness of less than about 20 mils.

18. A reflective imaging assembly, comprising:
    an interlaced image element with segments each comprising an elongate strip of an image; and
    a reflective substrate comprising a plurality of reflectors each having an elongate reflective surface extending parallel to the segments of the interlaced image and having a focal point proximate to a surface of the interlaced image element;
    wherein the interlaced image element further comprises a plurality of illumination gaps provided among the segments of the interlaced image element that are at least translucent to light and wherein light that passes through the illumination gaps in the interlaced image element strikes the reflectors and each of the reflectors is configured to focus the reflected light onto about one of the segments.

19. The assembly of claim 18, wherein the reflective surface of each of the reflectors has a parabolic shape when a cross section is taken transverse to its longitudinal axis, the parabolic shape being configured to have a focal point proximate to or on the interlaced image element surface.

20. The assembly of claim 19, wherein the reflective substrate comprises at least about 10 of the reflectors per inch as measured orthogonally to the reflector longitudinal axes.

21. The assembly of claim 20, wherein the parabolic shape is selected such that the focal length is less than about 20 mils.

22. The assembly of claim 21, further comprising a mounting substrate of material that is at least translucent to light positioned in abutting contact between the reflective substrate and the interlaced image element, the mounting substrate having a planar surface proximate to the focal point of the reflectors upon which the interlaced image element is positioned.

* * * * *